United States Patent Office 3,031,715
Patented May 1, 1962

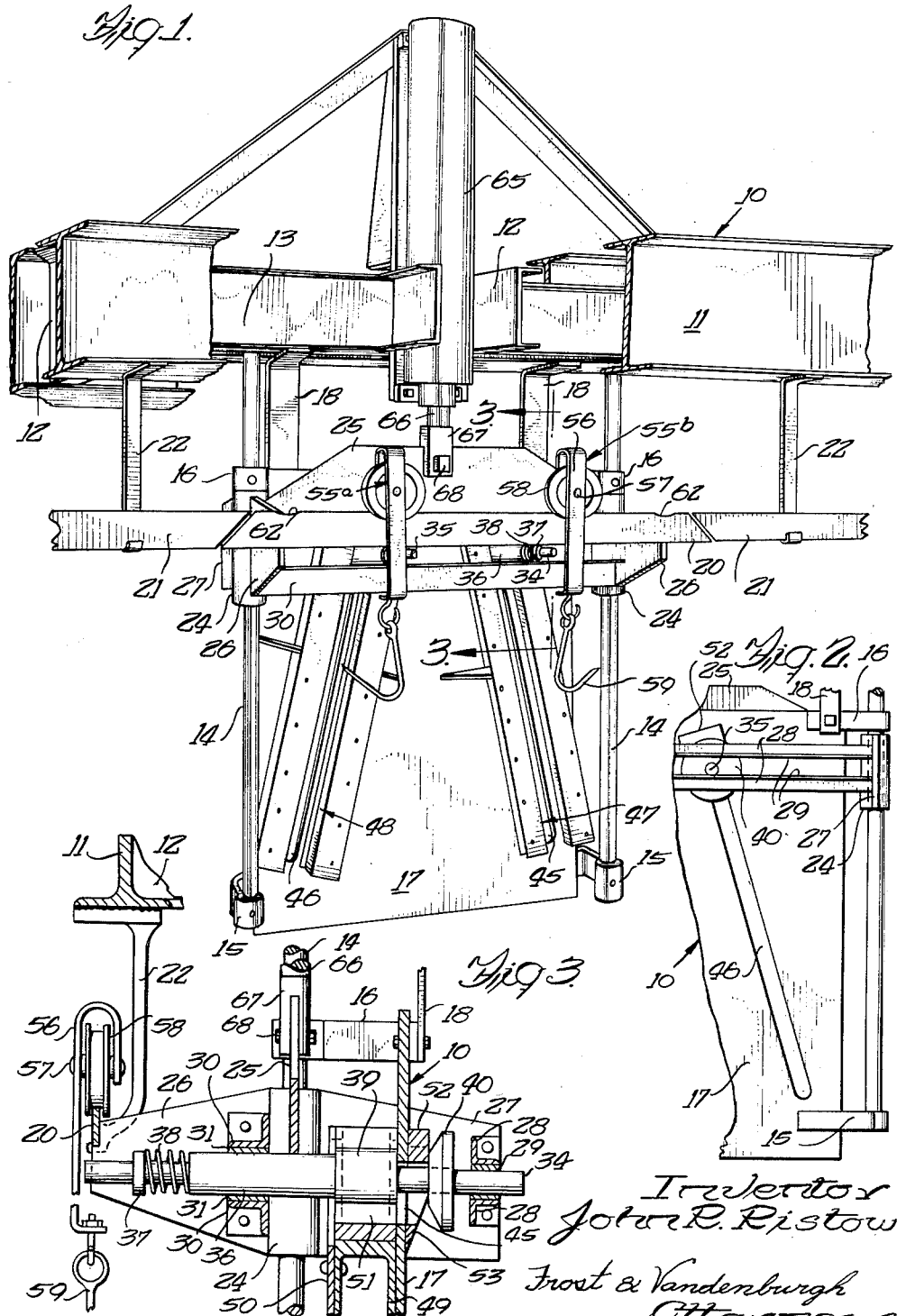

3,031,715
CARCASS LOWERING AND SPREADING DEVICE
John R. Ristow, Oak Lawn, Ill., assignor to St. John & Company, Chicago, Ill., a corporation of Illinois
Filed Sept. 15, 1959, Ser. No. 840,103
9 Claims. (Cl. 17—24)

The present invention relates to an apparatus for lowering and spreading a carcass, which apparatus is for use in a meat packing plant.

After cattle are slaughtered, in many packing plants it is customary to hang the carcasses by the rear legs from trolleys mounted on an overhead conveyor. The carcasses so supported are then moved along the conveyor from one area to the next with various processing operations on the carcass being carried out in the respective areas. For example, the carcass will be eviscerated at a first point along the conveyor then inspected, split, etc., at subsequent points along the conveyor. For various reasons, one of which is sanitation, the overhead conveyor is mounted at such a height that the carcasses will be a substantial distance above the floor in moving to and from the areas in which these processing operations take place. Thus in order for workers to perform the operations on the carcass, it is necessary that the worker be elevated up to the carcass or that the carcass be lowered down to the worker. The principal object of the present invention is to provide an apparatus for lowering the carcass down to the worker, while at the same time spreading the rear legs of the carcass by which it is hung to facilitate the carrying out of the processing operations on the carcass.

One of the main advantages of my invention is the simplicity of the apparatus for lowering and spreading the carcass. Only one source of power is employed for raising and lowering the carcass, while by the ingenious construction I have devised the vertical movement is employed to achieve a spreading of the trolleys on which the rear legs of the carcass are supported. The separation of the rear legs of the carcass results in an opening of the carcass to facilitate inspection of the cavity from which the contents were removed during evisceration. Similarly it may be employed to facilitate the splitting of the carcass into vertical halves.

Other advantages of my invention include: the ease of operation in raising, lowering and spreading the carcass; the relatively nominal capital investment involved; the ease of maintainence and the fact that the device may be maintained by the employees engaged in the maintainence of other packing house equipment, inasmuch as no special skills are involved; and the fact that the power employed is compatible with that used in other machinery in a packing house.

Further objects and advantages will become apparent from the following description taken in conjunction with the drawings in which:

FIGURE 1 is a perspective view of an embodiment of my invention;

FIGURE 2 is a partial rear view of the embodiment of FIGURE 1; and

FIGURE 3 is an enlarged partial section taken along line 3—3 of FIGURE 1.

The embodiment illustrated in the drawings comprises a frame, generally 10. Frame 10 includes suitable overhead supports such as I-beams 11, to which cross members 12 are secured to support a pair of spaced channels 13. Suspended vertically from channels 13 are a pair of spaced guide rods 14. Attached to the bottom end of guide rods 14 are brackets 15, while a similar pair of brackets 16 are secured to rods 14 adjacent the upper end thereof. A plate 17 is secured between brackets 15 and 16. Plate 17 also is supported from channel 13 by means of straps 18. Also suspended from beams 11 is a rail having a separate drop section 20 which is supported as hereinafter described. At each end of drop section 20 are rail continuations 21. The rails 21 are hung from beams 11 by means of brackets 22.

The support for rail 20 includes a pair of guides which slide on guide rods 14, respectively. Guides 24 are connected by a plate 25 adjacent the upper ends of the guides. Projecting forwardly from guides 24 are forward brackets 26 which support intermediate rail section 20. On the opposite side are rearwardly projecting brackets 27.

Between rearward brackets 27 is a way formed by a pair of spaced angle irons 28 to which are affixed wear plates 29 as seen in FIGURE 3. Similarly between forward brackets 26 is a way formed by spaced angle irons 30 and wear plates 31. A pair of pins 34 and 35 extend through the two ways with the ways being used to limit any vertical movement of the pins with respect to the track section 20, while permitting the pins to move horizontally, parallel to the track section.

The structure and mounting of each of pins 34 and 35 are identical. Referring particularly to FIGURE 3, it will be seen that pin 34 is received through a sleeve 36 with the sleeve bearing on wear plates 31. Forwardly of sleeve 36 is an annular abutment 37 secured to pin 34. A spring 38 between sleeve 36 and abutment 37 resiliently urges pin 34 forwardly, in the direction to the left in FIGURE 3. Rearwardly of sleeve 36 is a roller 39 suitably journaled on pin 34. To the rear of plate 17, a dish 40 is secured to pin 34 and forms a ridge on the pin.

Angularly disposed in plate 17 are a pair of slots 45 and 46. Slot 45 receives pin 34, while slot 46 receives pin 35. At the forward side of slots 45 and 46 are a pair of cam tracks generally 47 and 48, respectively. Roller 39 on pin 34 serves as a cam follower in track 47, while a corresponding roller on pin 35 acts as a cam follower in cam track 48. The sides of the cam tracks are formed of a channel 49, one flange of which is secured to plate 17. A supporting plate 50 is secured to the other flange of the channel. A wear plate 51 is secured to the web of channel 49 and is in contact with roller 39.

At the upper end of slots 45 and 46 is a cam block 52 having downwardly sloping sides 53 about each side of the slots 45 and 46.

A plurality of trolleys or movable carriages, two of which are illustrated at 55a and 55b in FIGURE 1, are supported on rails 20 and 21 for carrying the carcasses along the rail. Such trolleys are conventional in the industry and the details thereof form no part of the present invention except insofar as the trolleys are used in conjunction therewith. Such trolleys may assume the shape of a strap 56 having an upper re-entrant portion which is bridged by a shaft 57 and fits about the rails 20 and 21. A hook 59 hangs from the lower end of strap 56. Hook 59 provides a means by which a leg of a carcass may be hung from the trolley 55.

Adjacent the outer ends of rail 20 are a pair of depressions 62. A similar pair of depressions in rail 20 are provided in the positions occupied by the trolleys 55a and 55b in FIGURE 1.

The support for rail 20 is provided with a suitable power means for raising and lowering the support. In the illustrated embodiment this power means takes the form of a fluid cylinder 65 having a piston rod 66. Cylinder 65 is suitably mounted on the frame 10. A connecting block 67, is secured to piston rod 66 and has a slot in the lower side thereof to fit over plate 25. Block 67 and plate 25 are suitably attached as by means of a bolt 68.

In operation, the carcass lowering and spreading device of my invention is positioned at a point along rail 21 at which a particular operation is to be carried out on the carcass. The carcasses will be suspended from trolleys 55, usually with one rear leg of the carcass being affixed to one of hooks 59. Thus, two trolleys will be used for each carcass. The two trolleys supporting a carcass will be centered on rail 20. It will facilitate the positioning of the trolleys on rail 20 to have a pair of depressions in the rail in the positions occupied by the two trolleys in FIGURE 1. Fluid cylinder 65 is then actuated to lower piston rod 66 and the supporting structure for rail 20.

As the supporting structure moves downwardly, pins 34 and 35 will have a corresponding downward movement because of the constraint provided by the ways at each end of the pins. When the pins start downwardly, the two dishes 40 on pins 34 and 35 slide off of cam blocks 52 and allow springs 38 to push the two pins 34 and 35 towards the front. Thus, for example, pin 34 will move out to the left in FIGURE 3 to a position between trolley 55a and trolley 55b. Similarly, pin 35 will move outwardly into a position between the two trolleys. At the same time, pins 34 and 35 will be moving away from each other under the control of rollers 39, which ride in cam tracks 47 and 48. Thus, the pins 34 and 35 will be between the two trolleys and moving away from each other.

The continued movement of the pins downwardly acts to push trolleys 55a and 55b apart until the rail 20 reaches the lowermost point in its path of travel. At this time trolley 55a will be resting in the left depression 62, while trolley 55b will be resting in the depression 62 in the right hand end of rail 20 in FIGURE 1. The two trolleys will have spread the rear legs of the carcass thus opening the body cavity for inspection, etc. If the carcass is to be split at this time, that may be done. After splitting the depressions 62 will hold trolleys 55a and 55b in their final position during the subsequent raising of rail 20.

When whatever operation carried out on the carcass is complete, a reverse actuation of fluid cylinder 65 is initiated to raise rail 20 back to the position illustrated in FIGURE 1. As rail 20 moves upwardly, rollers 39 bring pins 34 and 35 toward each other. When the pins reach the upper end of slots 45 and 56, cam blocks 52 engage dishes 40 to move the pins toward the rear compressing spring 38. The rearward movement of the pins 34 and 35 will draw them under rail 20 so that they will now clear straps 56 of trolleys 55. As soon as rail 20 is returned to the position illustrated in FIGURE 1, the trolleys may be moved off of rail 20 and on to rail 21.

The foregoing description of a specific embodiment is for the purpose of complying with 35 U.S.C. 112 and should not be construed as imposing unnecessary limitations on the appended claims inasmuch as modifications and variations thereof will be apparent to those skilled in the art. For example, depressions such as 62 in rail 20 need not be used. Other means, or a manual operation, may be employed to suitably position trolleys 55 on rail 20. Power means other than fluid cylinder 65 may be employed to raise and lower the support for rail 20.

I claim:

1. A carcass lowering and spreading device including: a frame; a vertically movable support mounted on said frame; a pair of horizontally movable carriages mounted on said support, each of said carriages having means to engage a leg of a carcass; power means mounted on said frame and operatively connected to said support to move said support up and down with respect to said frame; and means mounted on said support to move at least one of said carriages of said pair away from the other when said support is lowered.

2. A carcass lowering and spreading device including: a frame, a rail supported from said frame, said rail having a vertically movable section; a vertically movable support mounted on said frame, said support being attached to said section of said rail; power means attached to said support to move said support up and down; a plurality of trolleys movable along said rail, each of said trolleys having means for supporting the leg of a carcass; cam means having portions on said frame and on said support to move one of said trolleys along said section of said rail when said section moves downwardly.

3. A carcass lowering and spreading device including: a frame, a rail supported from said frame, said rail having a vertically movable section; a vertically movable support mounted on said frame, said support being attached to said section of said rail; power means attached to said support to move said support up and down; a plurality of trolleys movable along said rail, each of said trolleys having means for supporting the leg of a carcass; a cam track mounted on said frame, said track being angularly disposed between the horizontal and vertical; a cam follower mounted on said support and contacting said cam track, said follower being mounted to said support for free movement horizontally with respect to said support but with restricted movement vertically with respect to said support; and means associated with said follower to operatively engage said follower and one of said trolleys when said section moves downward whereby the movement of said follower on said track will move said trolley to one side as said section moves downwardly.

4. A carcass lowering and spreading device including: a frame, a support mounted on said frame for substantially vertical movement with respect to said frame; power means connected to said frame and to said support to move said support with respect to said frame; a rail having fixed portions attached to said frame and an intermediate portion attached to said support for movement therewith; a plurality of trolleys on said rail, each trolley having means to engage a leg of a carcass whereby a carcass may be suspended by two legs from two trolleys; a pair of cam tracks mounted on said frame, said tracks being in a plane parallel to said intermediate section and sloping downwardly and outwardly away from each other; horizontal way means attached to said support; a pair of pins received in said way means whereby said pins are movable horizontally but not vertically with respect to said support; cam followers operatively connecting said cam tracks and said pins respectively, whereby said pins will be moved horizontally with respect to said support as said support moves vertically with respect to said cam tracks; and means associated with said pins to operatively connect said pins with a pair of trolleys on said intermediate section as said support moves downwardly whereby said pins will move said pair of trolleys away from each other.

5. A carcass lowering and spreading device including: a frame, a support mounted on said frame for substantially vertical movement with respect to said frame; power means connected to said frame and to said support to move said support with respect to said frame; a rail having fixed portions attached to said frame and an intermediate portion attached to said support for movement therewith; a plurality of trolleys on said rail and movable along a line defined by said rail, each trolley having means to engage a leg of a carcass whereby a carcass may be suspended by two legs from two trolleys; a pair of slotted cam tracks mounted on said frame, said tracks being in a plane parallel to said intermediate section and sloping downwardly and outwardly away from each other; horizontal way means attached to said support; a pair of pins received in said way means whereby said pins are movable horizontally but not vertically with respect to said support, said pins being movable longitudinally thereof in said ways toward and away from said trolleys on said track, said pins extending through the slots in said cam track, respectively; and means associated with said pins and said track to withdraw said pins from the line of movement of said trolleys when said pins are at the top of said tracks and to extend said pins into said line of movement when said pins are displaced from the top of said track, whereby when two trolleys supporting a carcass are positioned on said track outside of said two pins the downward movement of said support will extend said pins between said two trolleys with said pins thereafter being moved apart to contact and separate said trolleys and the legs of the carcass hanging therefrom.

6. A carcass lowering and spreading device including: a frame, a support mounted on said frame for substantially vertical movement with respect to said frame; power means connected to said frame and to said support to move said support with respect to said frame; a rail having fixed portions attached to said frame and an intermediate portion attached to said support for movement therewith; a plurality of trolleys on said rail, each trolley having means to engage a leg of a carcass whereby a carcass may be suspended by two legs from two trolleys; a pair of slotted cam tracks mounted on said frame, said tracks being in a plane parallel to said intermediate section and sloping downwardly and outwardly away from each other; horizontal way means attached to said support; a pair of pins received in said way means whereby said pins are movable horizontally but not vertically with respect to said support, said pins being movable longitudinally thereof in said ways toward and away from said trolleys on said track, said pins extending through the slots in said cam track, respectively; a cam block adjacent the top of said track, said block having a sloping face upwardly and away from said rail; a ridge on said pin rearwardly of said cam block from said rail; and means associated with said pin resiliently urging said pin in the direction of said rail, whereby when two trolleys supporting a carcass are positioned on said track outside of said two pins the downward movement of said support will extend said pins between said two trolleys with said pins thereafter being carried apart to contact and separate said trolleys and the legs of the carcass hanging therefrom.

7. A carcass lowering and spreading device including: a frame, a pair of spaced vertical guide rods depending from said frame; a support extending between said guide rods and movable with respect thereto; a rail extending along one side of said support, the intermediate portion of said rail adjacent said support being attached to said support, the two outside portions of said rail being affixed to said frame; power means attached to said support to move said support up and down along said guide rods; a plurality of trolleys movable along said rail, each of said trolleys having means for supporting the leg of a carcass; cam means having portions on said frame and on said support to move one of said trolleys along said section of said rail when said section moves downwardly.

8. A carcass lowering and spreading device including: a frame, a pair of spaced vertical guide rods depending from said frame; a support extending between said guide rods and movable with respect thereto; a fluid cylinder connected between said frame and the middle of said support to move said support up and down along said guide rods; a rail extending along one side of said support, the intermediate portion of said rail adjacent said support being attached to said support, the two outside portions of said rail being affixed to said frame; a plurality of trolleys movable along said rail, each of said trolleys having means for supporting the leg of a carcass; cam means having portions on said frame and on said support to move one of said trolleys along said section of said rail when said section moves downwardly.

9. A carcass lowering and spreading device including: a frame, a pair of spaced vertical guide rods depending from said frame; a support extending between said guide rods and movable with respect thereto; a fluid cylinder connected between said frame and the middle of said support to move said support up and down along said guide rods; a rail extending along one side of said support, the intermediate portion of said rail adjacent said support being attached to said support, the two outside portions of said rail being affixed to said frame; a plurality of trolleys on said rail, each trolley having means to engage a leg of a carcass whereby a carcass may be suspended by two legs from two trolleys; a pair of cam tracks mounted on said frame, said tracks being in a plane parallel to said intermediate section and sloping downwardly and outwardly away from each other; horizontal way means attached to said support; a pair of pins received in said way means whereby said pins are movable horizontally but not vertically with respect to said support; cam followers operatively connecting said cam tracks and said pins, respectively, whereby said pins will be moved horizontally with respect to said support as said support moves vertically with respect to said cam tracks; and means associated with said pins to operatively connect said pins with a pair of trolleys on said intermediate section as said support moves downwardly whereby said pins will move said pair of trolleys away from each other.

References Cited in the file of this patent

UNITED STATES PATENTS

| | | |
|---|---|---|
| 2,285,999 | Murphy | June 9, 1942 |
| 2,551,155 | Orling | May 1, 1951 |
| 2,883,700 | Liebmann | Apr. 29, 1959 |

FOREIGN PATENTS

| | | |
|---|---|---|
| 232,554 | Germany | Mar. 16, 1911 |
| 545,486 | France | July 21, 1922 |